United States Patent
Blackburn

(10) Patent No.: US 7,988,186 B2
(45) Date of Patent: Aug. 2, 2011

(54) AIRBAG SEAM PATTERN FOR INCREASED OCCUPANT PROTECTION

(75) Inventor: Jeffery S. Blackburn, Lake Orion, MI (US)

(73) Assignee: Automotive Systems Laboratory, Inc., Armada, MI (US)

( * ) Notice: Subject to any disclaimer, the term of this patent is extended or adjusted under 35 U.S.C. 154(b) by 1474 days.

(21) Appl. No.: 11/007,841

(22) Filed: Dec. 9, 2004

(65) Prior Publication Data
US 2005/0127651 A1    Jun. 16, 2005

Related U.S. Application Data

(60) Provisional application No. 60/528,530, filed on Dec. 10, 2003.

(51) Int. Cl.
*B60R 21/16* (2006.01)

(52) U.S. Cl. .................................................. 280/730.2

(58) Field of Classification Search .............. 280/728.1, 280/730.2, 730.1, 735, 801.1
See application file for complete search history.

(56) References Cited

U.S. PATENT DOCUMENTS

| | | | |
|---|---|---|---|
| 5,421,610 A * | 6/1995 | Kavanaugh et al. | 280/743.1 |
| 5,562,302 A | 10/1996 | Turnbull | 280/730.1 |
| 5,566,977 A | 10/1996 | Wipasuramonton | 280/743.1 |
| 5,586,782 A | 12/1996 | Zimmerman et al. | 280/730.2 |
| 5,975,564 A | 11/1999 | Smith et al. | |
| 6,129,377 A | 10/2000 | Okumura et al. | 280/730.2 |
| 6,220,625 B1 | 4/2001 | Wallner et al. | 280/730.2 |
| 6,355,123 B1 | 3/2002 | Baker et al. | 156/90 |
| 6,435,543 B1 * | 8/2002 | Magoteaux et al. | 280/730.2 |
| 6,575,496 B2 | 6/2003 | Hess et al. | 280/730.2 |
| 6,585,293 B2 | 7/2003 | Keshavaraj | 280/743.1 |
| 6,612,612 B2 | 9/2003 | Zerbe | 280/730.2 |
| 6,648,367 B2 * | 11/2003 | Breed et al. | 280/730.1 |
| 2002/0175503 A1 | 11/2002 | Hess et al. | 280/730.2 |
| 2005/0121888 A1 | 6/2005 | Sato et al. | 280/730.2 |

FOREIGN PATENT DOCUMENTS

GB    2393154 A  *  3/2004
JP    01064835 A  *  3/1989

OTHER PUBLICATIONS

Office Action for U.S. Appl. No. 11/009,310, filed Dec. 10, 2004 mailed May 17, 2005 (65).
Office Action for U.S. Appl. No. 11/009,310, filed Dec. 10, 2004 mailed Jul. 29, 2005 (65).
Office Action for U.S. Appl. No. 11/009,310, filed Dec. 10, 2004 mailed Feb. 10, 2006 (65).
Office Action for U.S. Appl. No. 11/009,310, filed Dec. 10, 2004 mailed Jul. 20, 2006 (65).
Office Action for U.S. Appl. No. 11/009,310, filed Dec. 10, 2004 mailed Dec. 27, 2006 (65).
Office Action for 11/009,310, filed Dec. 10, 2004 mailed Jun. 13, 2007 (65).
Office Action for 11/009,310, filed Dec. 10, 2004 mailed Jan. 8, 2005 (65).
Office Action for 11/009,310, filed Dec. 10, 2004 mailed Jan. 26, 2009 (65).

\* cited by examiner

*Primary Examiner* — Faye M. Fleming
(74) *Attorney, Agent, or Firm* — L.C. Begin & Associates, PLLC

(57) ABSTRACT

An airbag (10) for a vehicle occupant restraint system. The airbag includes an airbag body (12) defining an interior (15) of the airbag (10). A series of substantially sinusoidal seams (20) join together portions of the airbag body (12) to partition the airbag interior (15) into a plurality of fluidly communicating chambers (22). It is believed that characteristics of the airbag (10) during inflation and after inflation may be controlled by varying the characteristics of the sinusoidal seams (20).

18 Claims, 4 Drawing Sheets

AIRBAG SEAM PATTERN FOR INCREASED OCCUPANT PROTECTION

CROSS REFERENCE TO RELATED APPLICATIONS

This application claims the benefit of provisional application Ser. No. 60/528,530, filed on Dec. 10, 2003.

BACKGROUND OF THE INVENTION

The present invention relates generally to vehicle airbags and, more particularly, to a vehicle airbag incorporating features enabling control of airbag inflation and performance characteristics.

Many known side-impact airbags consist of an elongate airbag body that is deployable between a vehicle occupant and the side of the passenger compartment of a vehicle, typically substantially between an occupant's head and a vehicle window. Known systems also often utilize an airbag that is relatively thin as compared with its width. Various seams may be formed internally in the airbag body, connecting front and rear panels or sides of the airbag. In most cases, these seams are straight seams. The seams divide the airbag into a plurality of parallel compartments that form parallel inflated tubes upon inflation. These tubes serve to cushion the occupant in the event of a crash. However, the airbag may have a tendency to bend relatively easily along the straight seams, in some instances reducing occupant protection in the event of a crash. Particularly where an airbag is deployed during a forceful crash or sudden deceleration, a bending of the airbag body can allow for displacement of the airbag from a desired position or otherwise result in reduced occupant protection. It is also important to be able to control characteristics of the airbag during inflation (for example, the time required to inflate the airbag and the sequence in which different portions of the airbag inflate) to achieve desired airbag performance characteristics.

SUMMARY OF THE INVENTION

The present invention provides an airbag for a vehicle occupant restraint system comprising an airbag body defining an airbag interior, and having portions of the body joined by one or more substantially sinusoidal seams extending along the airbag body. The seams partition the airbag interior into a plurality of fluidly communicating chambers. It is believed that characteristics of the airbag during inflation (such as inflation rate and inflation profile) and characteristics of the airbag after inflation (such as resistance to bending along a seam) may be controlled by varying the characteristics of the sinusoidal seams.

DETAILED DESCRIPTION

The airbag of the present invention incorporates a series of substantially sinusoidal seams which join together adjacent portions of the airbag. Characteristics of the substantially sinusoidal seams may be varied to affect various inflation characteristics of the airbag, and to affect characteristics of the airbag in an inflated state. For purposes of the following disclosure, commonly known features of sinusoidal waveforms and definitions of terms relating to sinusoidal waveforms will apply (with some slight variations) to the substantially sinusoidal seams described herein.

Figure 1:
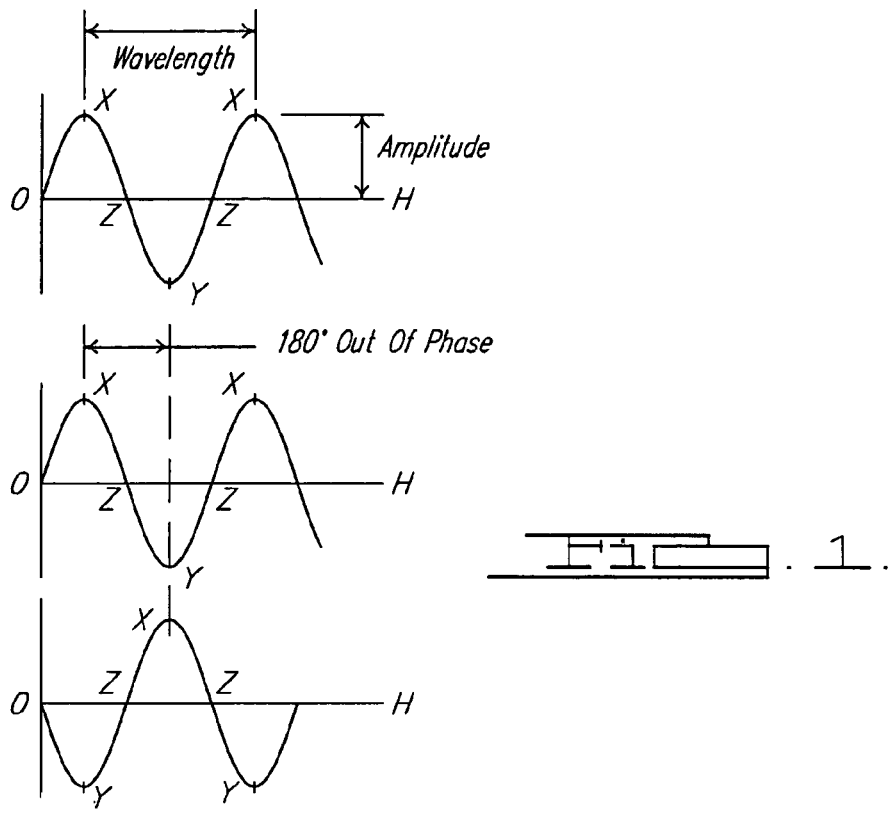
FIG. 1 is a graphical representation of definitions of terms applicable to the substantially sinusoidal seams of the present invention.

Specifically, as used herein, the term "amplitude" is understood to signify the maximum absolute value, or peak, of the waveform represented by the substantially sinusoidal seam of the present invention, measured with respect to a reference axis "H" as shown in FIG. 1. Also, as used herein, the term "wavelength" is understood to signify the distance between two points that are in the same phase in consecutive cycles of the substantially sinusoidal seam, measured as shown in FIG. 1. Also, the term "phase" as used herein is understood to signify the relationship between a first, reference point on the seam and a second point on the seam. The term "phase difference" is applied to two substantially sinusoidal seams having the substantially the same frequency, and is understood to signify the relationship between a point on a first seam and a corresponding point on a second seam. The phase of a seam and the phase difference between two seams is measured in radians. Phase relations between adjacent seams are shown by the relative positions of the peaks and troughs of the adjacent seams. Referring to FIG. 1, where the positions of the peaks (X), troughs (Y) and zero-crossing points (Z) of adjacent seams all coincide or are in alignment, the phase difference of the adjacent seams is zero. In this case, the adjacent seams are said to be "in-phase." In contrast, where the peaks (X) and troughs (Y) do not coincide, the seams are said to be "out of phase", and are said to exhibit a "phase difference." The term "frequency" is normally understood to signify the number of repetitions per unit time of a complete waveform. For purposes of this disclosure, the term "frequency" is understood to signify the number of repetitions of a complete waveform (as defined by the substantially sinusoidal seam of the present invention) per unit length of the airbag surface area along which the substantially sinusoidal seam extends.

Figure 2:
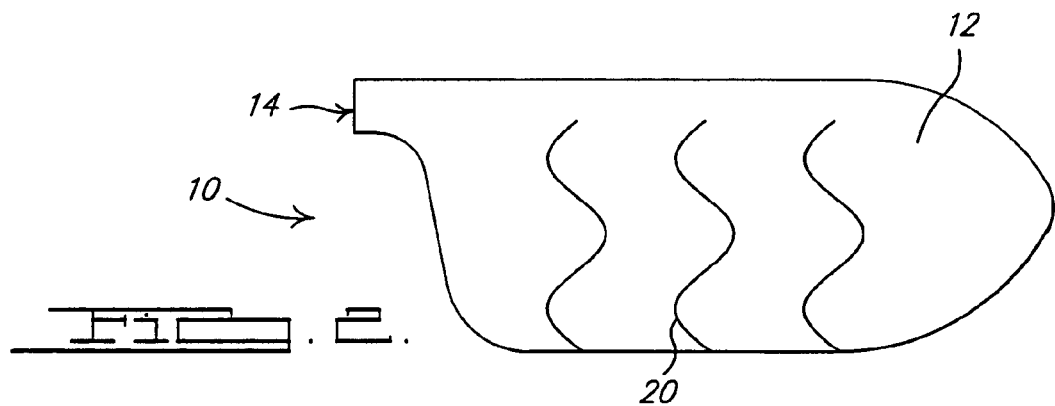
FIG. 2 is a side view of one embodiment of the airbag of the present invention.
Figure 2A:
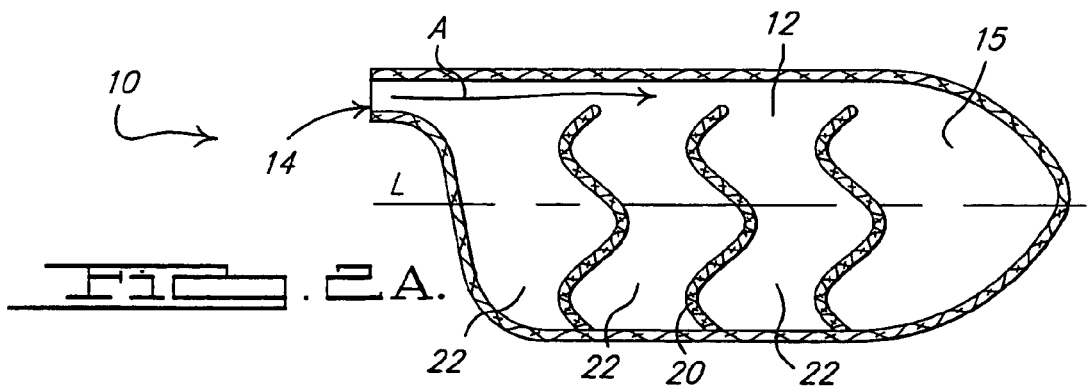
FIG. 2A is a side cross-sectional view of the airbag shown in FIG. 2.

Referring to FIGS. 2 and 2A, the present invention provides a side curtain airbag 10 including an airbag body 12 defining an interior 15 of the airbag, and at least one substantially sinusoidal seam 20 joining together portions of airbag body 12 to partition airbag interior 15 into a plurality of fluidly communicating chambers 22. Airbag 10 also has a longitudinal axis L. As seen in FIGS. 2 and 2A, each seam 20 forms a series of corrugations (i.e., a series of parallel and alternating peaks and troughs) characteristic of a sinusoidal waveform, or sine wave. A gas inlet opening 14 admits inflation gas produced by a conventional gas generator, in a manner known in the art. FIGS. 2 and 2A show airbag 10 as it would appear in a deployed state. Seams 20 assist in channeling the gas flow from inlet opening 14 into all portions of the airbag interior. The airbag shown in FIGS. 2 and 2A is an elongate bag used primarily for protection against side-impacts. However, the substantially sinusoidal seam 20 of the present invention may alternatively be formed on an airbag having any one of a variety of shapes or applications. The embodiment shown in FIGS. 2 and 2A has three sinusoidal seams 20. However, the number of seams 20 may vary from one to many. Moreover, seams 20 need not have the same length or phase, and need not be spaced uniformly along airbag 10.

Airbag body 12 may be formed from known materials and by known processes. Exemplary suitable airbag materials and manufacturing methods are set forth in U.S. Pat. Nos.: 6,632,753, 6,458,725 and 5,044,663 and United States Patent Application Publication Nos.: 2003/0148683, 2003/0129339, 2003/0104226, 2003/0060103 and 20020155774. Each listed reference is incorporated herein by reference in its entirety.

Seams 20 may be formed by any suitable known process. For example, in some instances it may be desirable to manually or mechanically sew stitches along the length of the seams 20. Alternative embodiments, for example utilizing a non-fabric or polymer coated fabric to form the airbag body, could employ heat, ultrasonic welding, or adhesives to secure the portions of the airbag together.

By joining together portions of airbag 10 using substantially sinusoidal seams 20, it is believed that various inflation characteristics of the airbag can be controlled. It is also believed that performance of the airbag in an inflated state can be favorably affected.

Figure 3:
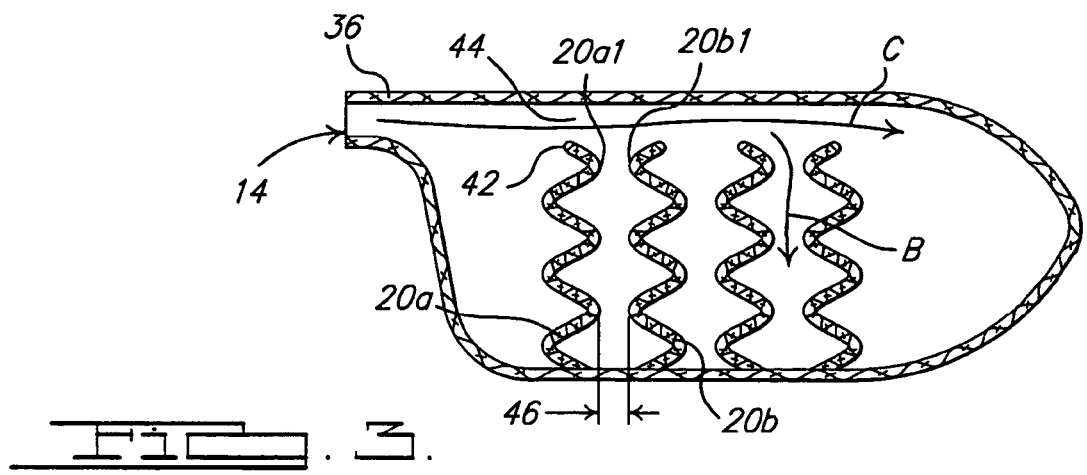
FIG. 3 is a side cross-sectional view of a second embodiment of the airbag of the present invention.
Figure 4:
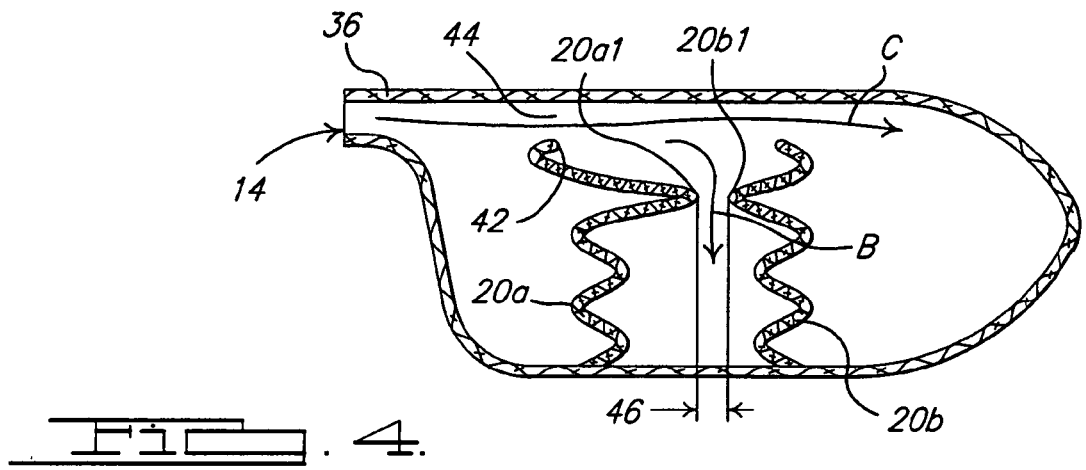
FIG. 4 is a side cross-sectional view of a third embodiment of the airbag of the present invention.

In one example, the arrangement and individual characteristics of the substantially sinusoidal seams may be manipulated to affect the sequence in which different portions of the airbag inflate. Referring to FIGS. 3 and 4, a portion 20$a$1 of a first seam 20$a$ is positioned adjacent a portion 20$b$1 of a second seam 20$b$ to define a gas flow passage 46 therebetween. Portion 20$a$1 of first seam 20$a$ is spaced apart from portion 20$b$1 of second seam 20$b$ such that gas flow passage 46 has a predetermined cross-sectional area.

Referring to FIG. 3, adjacent substantially sinusoidal seams 20$a$ and 20$b$ are approximately 180° out of phase with each other, with peaks 20$a$1 and 20$b$1 of the adjacent seams positioned in close proximity. This produces a constricted inflation gas flow passage 46 between adjacent peaks 20$a$1 and 20$b$1. Flow passage 46 has a relatively small cross-sectional area which retards gas flow in the direction indicated by arrow B. In contrast, a gas flow passage 44 formed between an upper edge 36 of the airbag and seam edges 42 has a relatively greater cross-sectional area, providing a much less restrictive flow path for inflation gases (in the direction of arrow C). The arrangement shown causes the airbag to inflate first along the top portion of the bag (along the aligned gas flow passages) and at the front of the airbag (at the end opposite gas inlet 14.) Constricted flow path 46 impedes flow of the inflation gases; thus, the lower portion of the bag takes longer to inflate. As seen in FIG. 3, the distance between peaks 20$a$1 and 20$b$1 (and the corresponding cross-sectional area of gas flow passage 46) may be controlled by controlling the phase difference between adjacent waveforms 20$a$ and 20$b$. When the adjacent seams are 180° out of phase, as shown in FIG. 3, peaks 20$a$1 and 20$b$ 1 will be at their points of closest approach to each other, in which case the cross-sectional area of flow passage 46 will be minimized. If the phase difference between adjacent seams 20$a$ and 20$b$ is more or less than 180°, the seams will be shifted with respect to each other, the effect of which is to increase the separation distance between peaks 20$a$1 and 20$b$1.

The constricted gas flow path previously described may also be created by providing a localized variation in the amplitude of one or more portions of adjacent sinusoidal seams. As seen in FIG. 4, one or both of peaks 20$a$1 and 20$b$1 may be structured to approach each other more closely than the remaining peaks in the respective waveforms. For example, the amplitude of seam 20$a$ may be varied along the portion of the seam defining gas flow passage 46, thereby positioning seam portion 20$a$1 spaced apart from the seam portion 20$b$ 1 such that gas flow passage 46 between the portions of the seams has the predetermined cross-sectional area.

Figure 5:
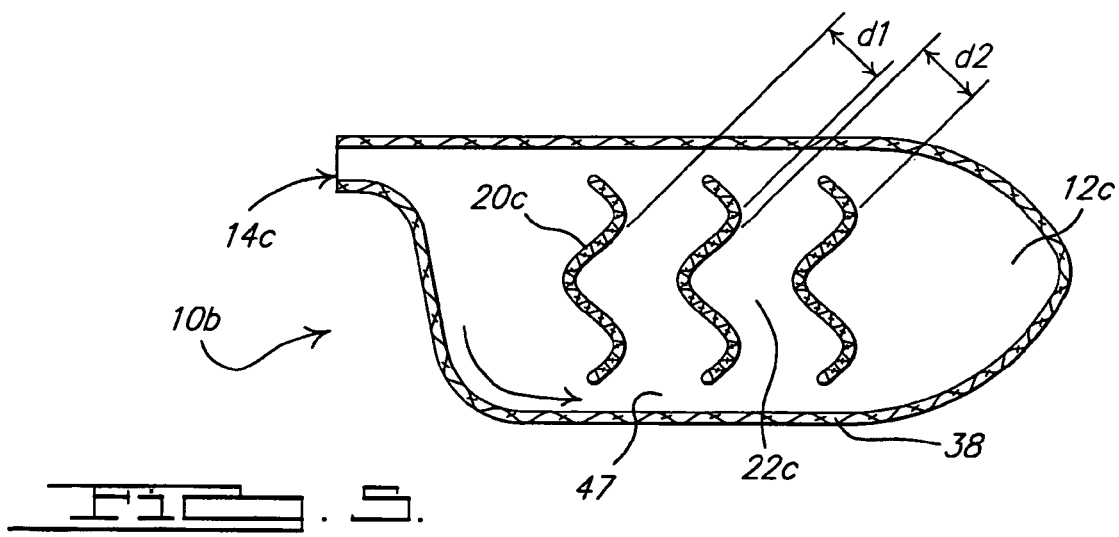
FIG. 5 is a cross-sectional side view of a fourth embodiment of the airbag of the present invention.

Referring to FIG. 5, in another embodiment, airbag 10$b$ may include a plurality of substantially sinusoidal seams 20$c$ joining together portions of airbag body 12$c$, each of seams 20$c$ having a substantially equal length as measured along the seam. In addition, the frequencies of seams 20$c$ may be substantially equal, the amplitudes of seams 20$c$ may be substantially equal, and seams 20$c$ may all be substantially in-phase with each other. Furthermore, the minimum separation distances d1 and d2 between adjacent seams 20$c$ may be substantially equal. Uniformity of these characteristics promotes uniform inflation of all portions of the airbag interior.

Referring again to FIG. 5, seams 20$c$ may also be shortened as shown to provide a flow passage 47 in communication with chambers 22$c$ and extending substantially parallel with a lower edge 38 of the airbag. Provision of a flow passage 47 in communication with chambers 22$c$ also promotes uniform inflation of all portions of the airbag interior.

It is believed that various performance characteristics of the airbag in an inflated state can be favorably affected by connecting portions of the airbag using substantially sinusoidal seams as described above. It also is believed that the substantially sinusoidal shape of the seams described herein imparts a greater resistance to bending along the seams than is present in designs utilizing straighter seams. Specifically, the amplitude and/or frequency of a particular seam may be adjusted to inhibit bending of the airbag along the seam when the airbag is in an inflated state. This is accomplished by providing a substantially sinusoidal seam having a predetermined minimum amplitude and/or frequency. It is believed that, as the amplitude of the seam increases, the resistance of the airbag to bending along the seam will generally increase, due to a reduction in the overall straightness of the seam and a reduction in the alignment of the various portions of the seam. Similarly, for a given amplitude, it is believed that resistance of the airbag to bending along the seam will increase as the frequency of the seam increases, due to a reduction in the overall straightness of the seam and a reduction in the alignment of the various portions of the seam. Thus, specifying a seam having a predetermined minimum amplitude and/or frequency should impart a desired sufficient longitudinal stiffness to the airbag. The predetermined minimum amplitude and/or frequency can be determined by experimentation based on a particular application.

Figure 6A:
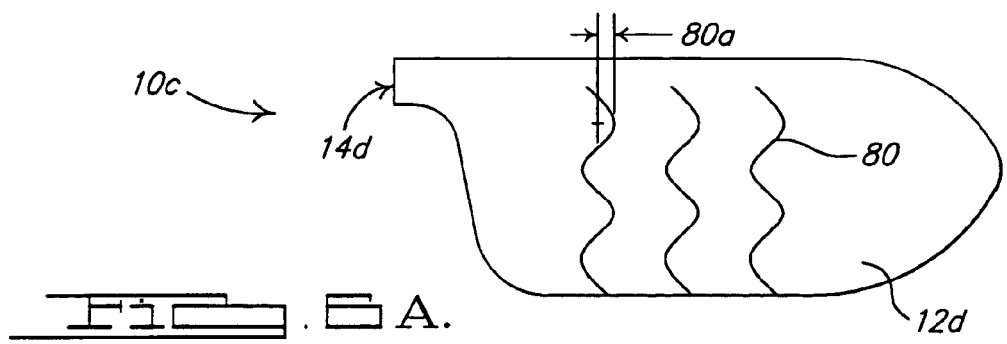
FIGS. 6A and 6B show a comparison between airbags in accordance with the present invention having substantially sinusoidal seams with different amplitudes.
Figure 6B:
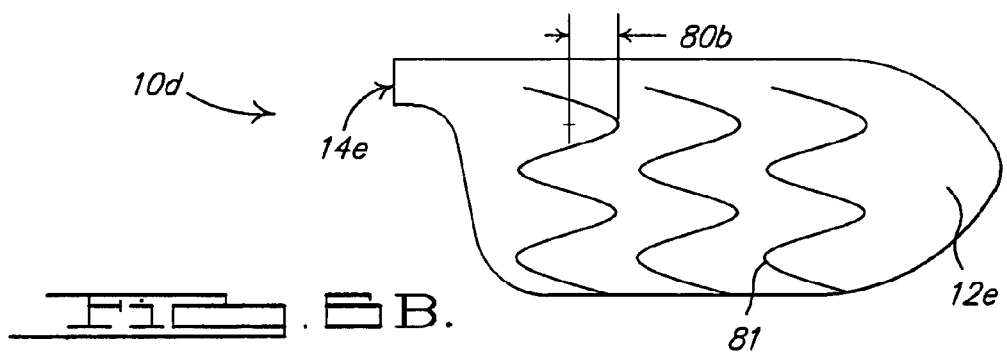

FIGS. 6A, 6B, 7A and 7B show examples of airbags illustrating these principles. FIGS. 6A and 6B show airbags 10$c$ and 10$d$ having respective airbag bodies 12$d$ and 12$e$, gas inlets 14$d$ and 14$e$, and substantially sinusoidal seams 80 and 81 with different amplitudes 80$a$ and 81$a$, respectively. From the drawings, it may be seen that amplitude 81$a$ is greater than amplitude 80$a$. The greater amplitude of seam 80 acts to reduce the overall "straightness" of the seam, reducing the alignment between the various portions of the seam.

Figure 7A:
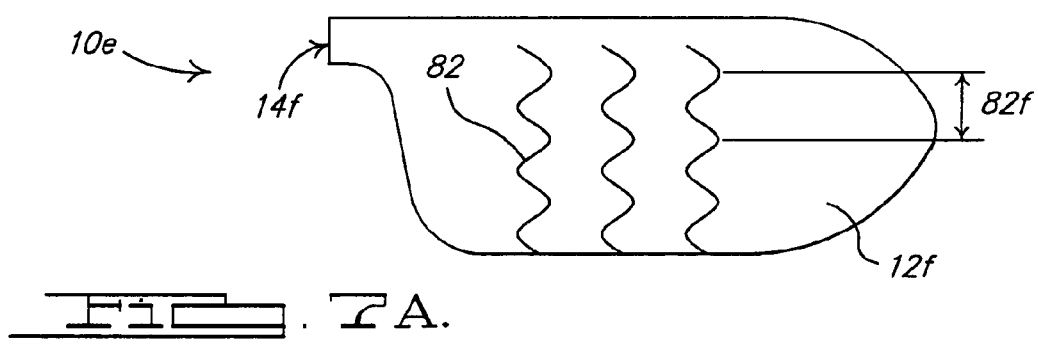
FIGS. 7A and 7B show a comparison between airbags in accordance with the present invention having substantially sinusoidal seams with different frequencies.
Figure 7B:
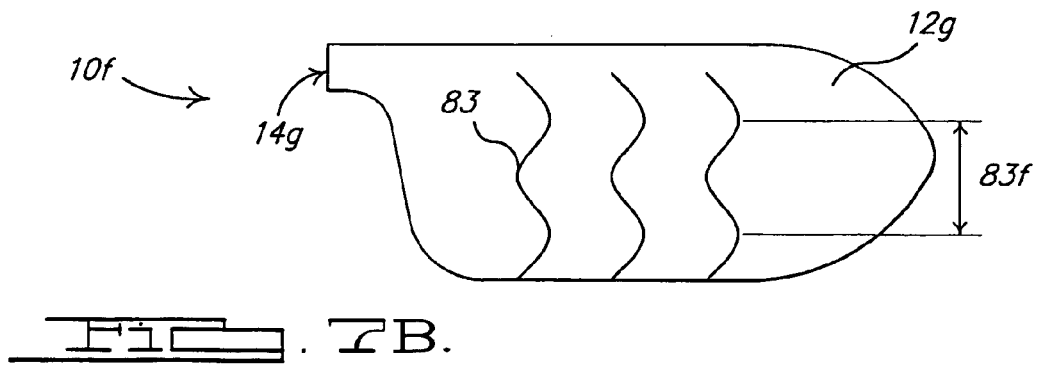

FIGS. 7A and 7B show airbags 10e and 10f having respective airbag bodies 12f and 12g, gas inlets 14f and 14g, substantially sinusoidal seams 82 and 83 with different frequencies 82f and 83f, respectively. From the drawings, it may be seen that frequency 82f is greater than frequency 83f. The greater frequency of seam 80 acts to reduce the overall "straightness" of the seam, reducing the alignment between the various portions of the seam. It is believed that the increased misalignment between the portions of the seam reduces the likelihood of the airbag bending along the seam.

In all of the embodiments described above, the individual characteristics of the substantially sinusoidal seams and the patterns into which the seams are formed are varied to affect various performance aspects of the airbag. Accordingly, as may be seen from the above examples, the spacing, size, length, orientation, etc., of the seams might be varied to an almost infinite degree, allowing for specific tailoring of the performance characteristics of the airbag as desired.

Figure 8:
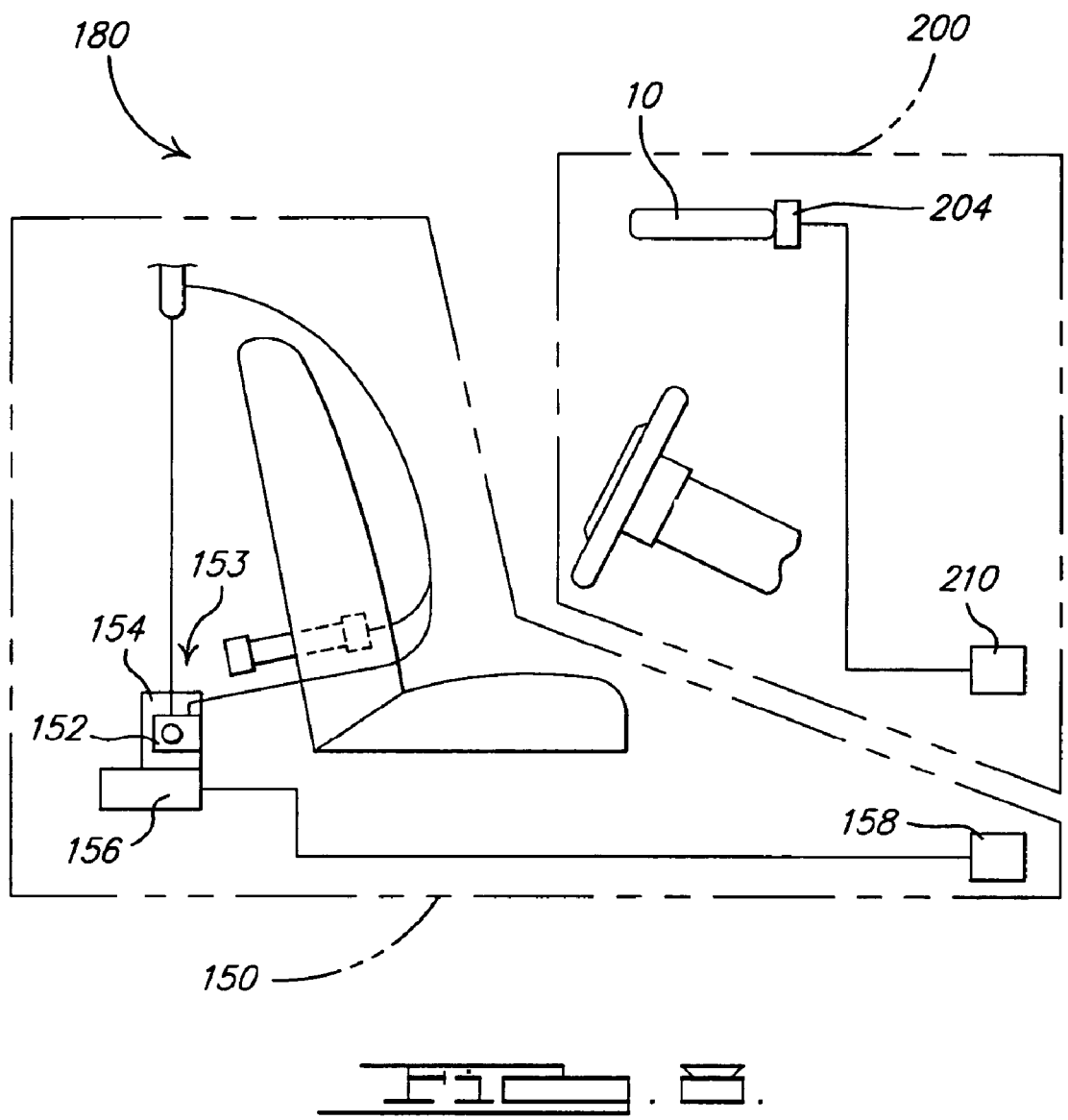
FIG. 8 is a schematic representation of an exemplary vehicle occupant restraint system incorporating an airbag in accordance with the present invention.

Any of the airbag embodiments described above may also be incorporated into an airbag assembly 150, as seen in FIG. 8. Airbag assembly 150 includes at least one side-impact airbag 10 as described herein and an inflator 204 coupled to airbag 10 so as to enable fluid communication with an interior of the airbag. Inflator 204 contains a combustible gas generant composition for generating inflation gas for inflating airbag 10, and at least one igniter for igniting the gas generant composition in the inflator. Examples of inflators which may be incorporated into airbag system 200 are described in U.S. Pat. Nos. 6,752,421, 5,806,888, and 6,341,799, all incorporated herein by reference. Airbag system 200 may also be in communication with a crash event sensor 210 including a known crash sensor algorithm that signals actuation of airbag system 200 via, for example, activation of airbag inflator 204 in the event of a collision.

Referring again to FIG. 8, airbag assembly 200 may also be incorporated into a broader, more comprehensive vehicle occupant restraint system 180 including additional elements such as a safety belt assembly 150. FIG. 12 shows a schematic diagram of one exemplary embodiment of such a restraint system. Safety belt assembly 150 includes a safety belt housing 152 and a safety belt 151 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners which may be used in system 180 are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. An airbag comprising:
    an airbag body defining an interior of the airbag; and
    at least one substantially sinusoidal seam joining together portions of the airbag body to partition the airbag interior into a plurality of fluidly communicating chambers, the seam being constructed so as not to tear during inflation of the airbag.

2. The airbag of claim 1 wherein the at least one substantially sinusoidal seam has a predetermined minimum amplitude.

3. The airbag of claim 1 wherein the at least one substantially sinusoidal seam has a predetermined minimum frequency.

4. The airbag of claim 1 further comprising at least first and second substantially sinusoidal seams joining together portions of the airbag body, and wherein a portion of the second seam is positioned adjacent a portion of the first seam to define a gas flow passage therebetween, the portion of the first seam being spaced apart from the portion of the second seam such that the gas flow passage has a predetermined cross-sectional area.

5. The airbag of claim 4 wherein the first seam has substantially the same frequency as the second seam, and the second seam has a phase difference with respect to the first seam, the phase difference being sufficient to position the portion of the second seam spaced apart from the portion of the first seam such that the gas flow passage between the portions of the seams has the predetermined cross-sectional area.

6. The airbag of claim 5 wherein the phase difference is approximately 180°.

7. The airbag of claim 4 wherein an amplitude of at least one of the first and second seams varies along the portion of the seam defining the gas flow passage, thereby positioning the portion of the seam spaced apart from the portion of the other one of the first and second seams defining the gas flow passage, such that the gas flow passage between the portions of the seams has the predetermined cross-sectional area.

8. The airbag of claim 1 wherein the airbag is a side curtain airbag.

9. The airbag of claim 1 further comprising a plurality substantially sinusoidal seams joining together portions of the airbag body to partition the airbag interior into a plurality of fluidly communicating chambers, each of the seams having a length, and wherein the lengths of the seams are substantially equal.

10. The airbag of claim 1 further comprising a plurality substantially sinusoidal seams joining together portions of the airbag body to partition the airbag interior into a plurality of fluidly communicating chambers, and wherein minimum separation distances between adjacent ones of the seams are substantially equal.

11. The airbag of claim 1 further comprising a plurality substantially sinusoidal seams joining together portions of the airbag body to partition the airbag interior into a plurality of fluidly communicating chambers, and wherein the amplitudes of the seams are substantially equal.

12. The airbag of claim 1 further comprising a plurality substantially sinusoidal seams joining together portions of the airbag body to partition the airbag interior into a plurality of fluidly communicating chambers, and wherein the frequencies of the seams are substantially equal.

13. The airbag of claim 1 further comprising a plurality of substantially sinusoidal seams joining together portions of the airbag body to partition the airbag interior into a plurality of fluidly communicating chambers, and wherein the seams are all substantially in phase with each other.

14. An airbag system comprising:
- at least one airbag having an airbag body with portions thereof joined together by at least one substantially sinusoidal seam extending along the airbag body, the seam being constructed so as not to tear during inflation of the airbag; and
- an inflator coupled to the airbag so as to enable fluid communication with an interior of the airbag upon activation of the inflator.

15. The airbag system of claim 14 in combination with a crash event sensor in operative communication with the airbag system, the crash event sensor including a known crash sensor algorithm that signals activation of the airbag system in the event of a collision.

16. A vehicle occupant restraint system comprising:
- an airbag system including at least one airbag having an airbag body with portions thereof joined together by at least one substantially sinusoidal seam extending along the airbag body, the seam being constructed so as not to tear during inflation of the airbag, and an inflator coupled to the airbag so as to enable fluid communication with an interior of the airbag upon activation of the inflator.

17. The vehicle occupant restraint system of claim 16 further comprising a safety belt assembly including a housing and a safety belt extending from the housing.

18. The vehicle occupant restraint system of claim 16 in combination with a crash event sensor in operative communication with the vehicle occupant restraint system, the crash event sensor including a crash sensor algorithm that signals activation of the vehicle occupant restraint system in the event of a collision.

* * * * *

UNITED STATES PATENT AND TRADEMARK OFFICE
CERTIFICATE OF CORRECTION

| | | |
|---|---|---|
| PATENT NO. | : 7,988,186 B2 | Page 1 of 1 |
| APPLICATION NO. | : 11/007841 | |
| DATED | : August 2, 2011 | |
| INVENTOR(S) | : Blackburn | |

It is certified that error appears in the above-identified patent and that said Letters Patent is hereby corrected as shown below:

Col. 3, Line 64, Delete "20b 1" and Insert -- 20b1 --

Col. 4, Line 13, Delete "20b 1" and Insert -- 20b1 --

Signed and Sealed this
Eleventh Day of October, 2011

David J. Kappos
*Director of the United States Patent and Trademark Office*